US005636083A

United States Patent [19]
Sanada

[11] Patent Number: 5,636,083
[45] Date of Patent: Jun. 3, 1997

[54] MAGNETIC DISK ASSEMBLY

[75] Inventor: Yotaro Sanada, Tokyo, Japan

[73] Assignee: NEC Corporation, Tokyo, Japan

[21] Appl. No.: 391,704

[22] Filed: Feb. 21, 1995

[30] Foreign Application Priority Data

Feb. 22, 1994 [JP] Japan .................................. 6-023853

[51] Int. Cl.$^6$ .......................... G11B 23/03; G11B 17/038
[52] U.S. Cl. ............................... 360/98.08; 360/99.12
[58] Field of Search .......................... 360/98.08, 99.05, 360/99.12

[56] References Cited

FOREIGN PATENT DOCUMENTS

| 2-166683 | 6/1990 | Japan | .................................. 360/98.08 |
|---|---|---|---|
| 2292786 | 12/1990 | Japan. | |
| 4-184758 | 7/1992 | Japan | .................................. 360/98.08 |
| 4-195781 | 7/1992 | Japan | .................................. 360/98.08 |
| 4-222958 | 8/1992 | Japan | .................................. 360/98.08 |
| 4-259972 | 9/1992 | Japan | .................................. 360/98.08 |
| 5-166328 | 7/1993 | Japan | .................................. 360/98.08 |

*Primary Examiner*—Stuart S. Levy
*Assistant Examiner*—William J. Klimowicz
*Attorney, Agent, or Firm*—Whitham, Curtis, Whitham & McGinn

[57] ABSTRACT

A magnetic disk assembly having a stack of magnetic disks supported by a clamp ring is disclosed. A cap is fastened to the top of a spindle hub by screws beforehand. Subsequently, a clamp ring is affixed to the cap by shrinkage fit. Even when some defects are found on a stack of disks, the defective disks can be readily removed from the spindle hub and replaced.

13 Claims, 2 Drawing Sheets

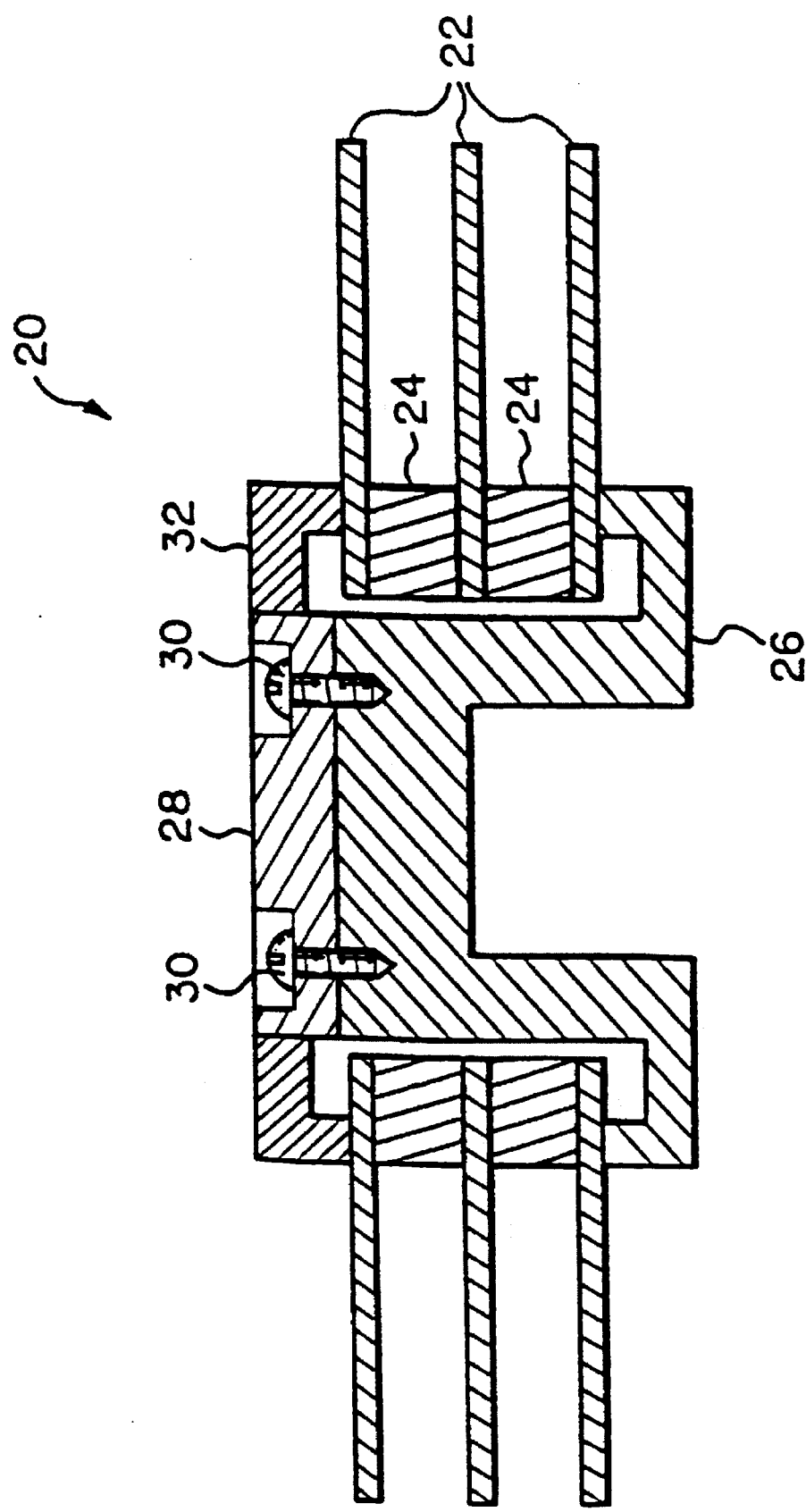

MAGNETIC DISK ASSEMBLY

BACKGROUND OF THE INVENTION

The present invention relates to a magnetic disk assembly for use in a data processing apparatus or similar apparatus and, more particularly, to a magnetic disk assembly having a stack of magnetic disks capable of recording a great amount of data and supported by a clamp ring.

One of conventional magnetic disk assemblies is disclosed in Japanese Patent Laid-Open Publication No. 2-292786. The disk assembly has a plurality of magnetic disks and a plurality or spacer rings alternating with each other. The spacer rings each separates the nearby disks and adjoins the inner edges of the disks. An annular groove is formed in the outer circumference of each spacer ring. A spindle hub has a flange portion at the bottom thereof. The flange portion is formed with a first annular support surface contacting the lowermost or bottom disk. A clamp ring has a second annular support surface facing the first support surface of the spindle hub and contacting the uppermost or top disk. The disks and spacer rings alternating with each other are supported by the first and second support surfaces of the spindle hub and clamp ring. The clamp ring is heated, fitted on the outer periphery of the spindle hub, and then cooled off. As a result, the clamp ring is affixed to the spindle hub in a predetermined position, thereby fastening the stack of disks and spacer rings.

However, the conventional disk assembly described above has some problems yet to be solved, as follows. The clamp ring is affixed to the spindle hub by shrinkage fit. Specifically, the clamp ring is heated to a high temperature so as to increase the inside diameter due to expansion. In this condition, it is coupled over the spindle hub and then cooled off. As a result, the inside diameter of the clamp ring is reduced due to shrinkage, fastening the clamp ring to the spindle hub. Hence, once the disks alternating with the spacer rings are affixed to the spindle hub by the clamp ring, they cannot be removed from the hub. It follows that when scratches or similar defects are found, even on part of the disks, the entire disk assembly must be replaced or discarded. This increases the production cost of the disk assembly to a critical degree.

SUMMARY OF THE INVENTION

It is, therefore, an object of the present invention to provide a magnetic disk assembly allowing defective magnetic disks to be removed therefrom and replaced with ease.

A magnetic disk assembly of the present invention has a plurality of magnetic disks capable of storing a great amount of data, a plurality of spacer rings alternating with the magnetic disks for defining a predetermined space between the nearby magnetic disks, a spindle hub having a first annular support surface contacting one of the magnetic disks positioned at the bottom, a cap fastened to the top of the spindle hub by screws, and a clamp ring having a second annular support surface facing the first annular support surface and contacting one of the magnetic disks located at the top. The clamp ring is affixed to the cap by shrinkage fit after the cap has been fastened to the top of the spindle hub.

BRIEF DESCRIPTION OF THE DRAWINGS

The above and other objects, features and advantages of the present invention will become more apparent from the following detailed description taken with the accompanying drawings in which:

FIG. 2 is a vertical section showing a magnetic disk assembly embodying the present invention.

DESCRIPTION OF THE PREFERRED EMBODIMENT

Figure 1:
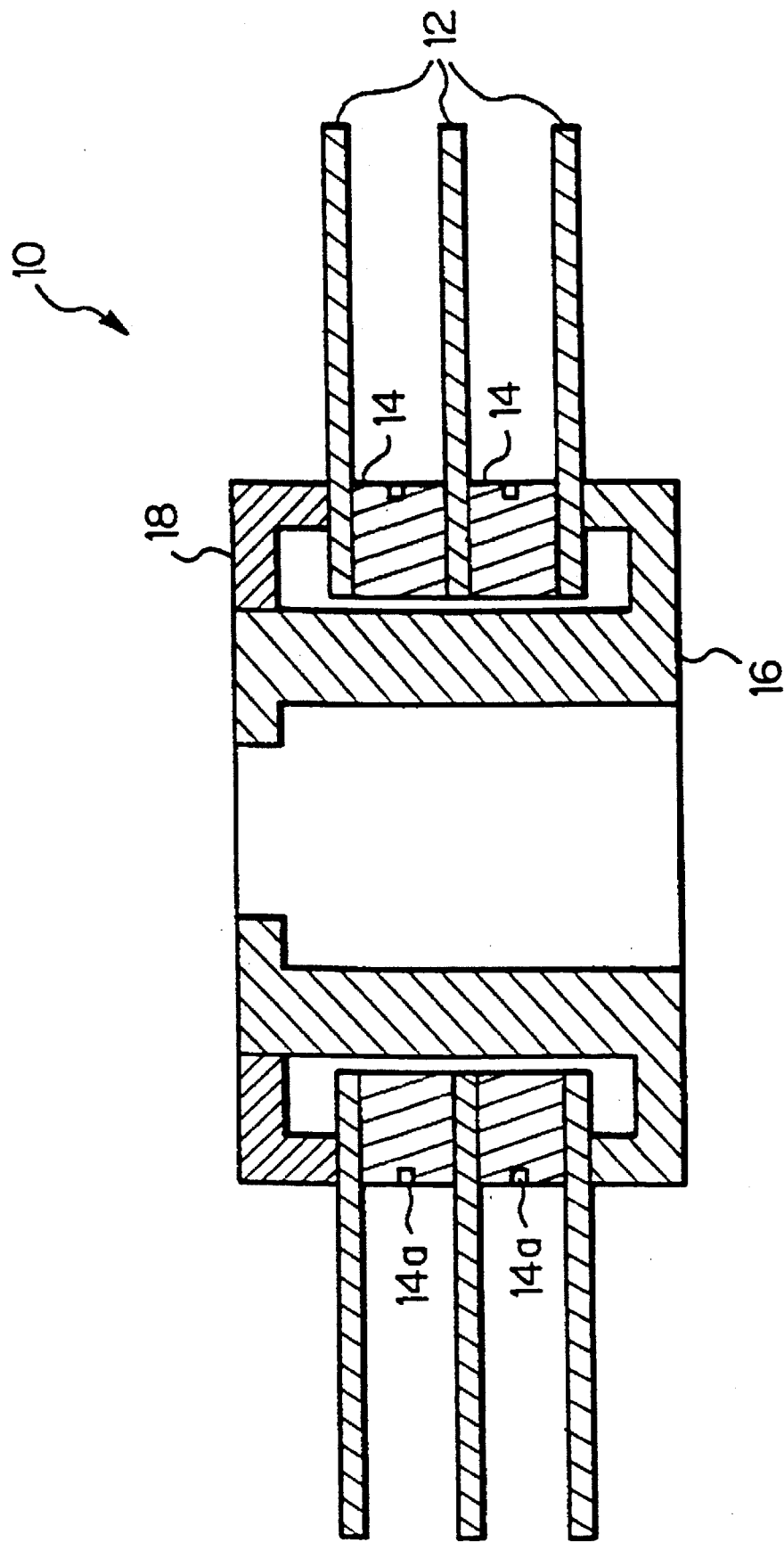
FIG. 1 is a vertical section of a conventional magnetic disk assembly.

To better understand the present invention, a brief reference will be made to a conventional magnetic disk assembly, shown in FIG. 1. The disk assembly to be described is of the type taught in previously mentioned Japanese Patent Laid-Open Publication No. 2-292786. As shown, the disk assembly, generally 10, has a plurality of magnetic disks 12 and a plurality of spacer rings 14 alternating with each other. The spacer rings 14 each separate the nearby disks 12 and adjoins the inner edges of the disks 12. An annular groove 14a is formed in the outer circumference of each spacer ring 14. A spindle hub 16 has a flange portion at the bottom thereof. The flange portion is formed with a first annular support surface contacting the lowermost or bottom, disk 12. A clamp ring 18 has a second annular support surface facing the first support surface of the spindle hub 16 and contacting the uppermost or top disk 12. The disks 12 and spacer rings 14 alternating with each other are supported by the first and second support surfaces of the spindle hub 16 and clamp ring 18. The clamp ring 18 is heated, fitted on the outer periphery of the spindle hub 16, and then cooled off. As a result, the clamp ring 18 is affixed to the spindle hub in a predetermined position, thereby fastening the stack of disks 12 and spacer rings 14.

However, the problem with the conventional disk assembly 10 is that once the disks 12 alternating with the spacer rings 14 are affixed to the spindle hub 16, they cannot be removed from the hub 16, as discussed earlier.

Referring to FIG. 2, a magnetic disk assembly embodying the present invention is shown and generally designated by the reference numeral 20. As shown, the disk assembly 20 has a plurality of magnetic disks 22 capable of storing a great amount of data. The disks 22 are spaced a predetermined distance from each other by spacer rings 24. The spacer rings 24 each adjoins the inner edges of the nearby disks 22. A spindle hub 26 has a flange portion at the lower end thereof. The flange portion has a first annular support surface contacting the bottom disk 22. A cap 28 is fastened to the top of the spindle hub 26 by screws 30. The cap 28 has a cylindrical configuration having a diameter equal to the outside diameter of the spindle hub 26. A clamp ring 32 has a second annular support surface facing the first support surface of the spindle hub 26 and contracting the top disk 22. After the cap 28 has been affixed to the spindle hub 26, the inner periphery of the clamp ring 32 is affixed to the outer periphery of the cap 28 by shrinkage fit. As a result, the disks 22 and spacer rings 24 are supported in a stack by the spindle hub 26 and clamp ring 32.

The disk assembly 20 is produced by the following procedure. First, the disks 22 and spacer rings 24 are stacked and accurately positioned on the spindle hub 26 while alternating with each other. Subsequently, the cylindrical cap 28 is fastened to the top of the spindle hub 26 by the screws 30. The clamp ring 32 is heated to have the inside diameter thereof increased. Then, the clamp ring 32 is coupled over the cap 28 and located at a predetermined position. Thereafter, the clamp ring 32 is cooled off. Consequently, the inner periphery of the clamp ring 32 and the outer periphery of the cap 28 are firmly affixed to each other. In this condition, the disks 22 and spacer rings 24 are affixed to the spindle hub 26.

Today, magnetic disks are noticeably decreasing in size and thickness. For example, 3.5 inch disks are as thin as about 0.8 millimeter. If such thin disks 22 are affixed to the spindle hub 26 by screws or similar fastening means, loads concentrate on the portions where the screws are positioned and cause the disks 22 to be noticeably distorted. As a result, a slider, carrying a magnetic head thereon for writing or reading data in or out of the disk 22, is displaced and fails to perform the expected function with accuracy.

In accordance with the present invention, the cylindrical cap 28 has a diameter equal to the outside diameter of the spindle hub 26 and is affixed to the spindle hub 26 by screws 30 beforehand. Subsequently, the clamp ring 32 is fitted on the cap 28 by shrinkage fit. Such a procedure successfully scatters loads acting on the disks 22 and thereby protects the disks 22 from distortion. In addition, when scratches or similar defects are found on any of the disks 22, the defective disks 22 can be easily replaced only if the screws 30 are moved to dismount the cap 28 and clamp ring 32.

It is to be noted that the cap 28 should preferably be affixed to the spindle hub 26 by a great force.

In summary, in accordance with the present invention, a magnetic disk assembly has a cap fastened to the top of a spindle hub by screws beforehand, and a clamp ring affixed to the cap by shrinkage fit. Hence, even when some defects are found on a stack of disks, only the defective disks can be readily removed from the spindle hub and replaced. Therefore, it is needless to replace or discard the entire disk assembly. This prevents the production cost of the disk assembly from increasing.

Various modifications will become possible for those skilled in the art after receiving the teachings of the present disclosure without departing from the scope thereof.

What is claimed is:

1. A magnetic disk assembly comprising:
    a plurality of magnetic disks for storing data;
    a plurality of spacer rings alternating with said plurality of magnetic disks for defining a predetermined space between adjacent ones of said magnetic disks;
    a spindle hub having a first annular support surface contacting a lowermost one of said plurality of magnetic disks;
    a cap fastened to a first end of said spindle hub by screws; and
    a shrink-fit clamp ring having a second annular support surface facing said first annular support surface and contacting an uppermost one of said plurality of magnetic disks, said clamp ring being affixed to said cap by shrinkage fitting after said cap has been fastened to said first end of said spindle hub.

2. An assembly as claimed in claim 1, wherein said cap has a cylindrical configuration having a diameter equal to an outside diameter of said spindle hub.

3. A magnetic disk assembly as recited in claim 1 wherein said screws comprise at least two screws which are countersunk into said cap.

4. A magnetic disk assembly, comprising:
    a support hub comprising a cylindrical portion and a flange projecting from a bottom end of said cylindrical portion;
    a stack of magnetic disks, each of said magnetic disks in said stack having an annular shape and having a center aperture for fitting over said cylindrical portion of said support hub;
    a plurality of spacers placed over said cylindrical portion of said support hub, respective ones of said plurality of spacers alternating between adjacent ones of said magnetic disks in said stack;
    a cap removably fastened to a first end of said support hub; and
    a clamp ring having an inner portion contacting an outer diameter of said cap and a projecting lip for putting pressure on said stack of magnetic disks, wherein said clamp ring comprises a shrink-fit clamp shrunk-fit to said cap, which applies a substantially uniform pressure around a center of said stack of magnetic disks.

5. A magnetic disk assembly as recited in claim 4 wherein said cap is removably fastened to said first end of said support hub with at least one screw.

6. A magnetic disk assembly as recited in claim 4 wherein said cap is removably fastened to said first end of said support hub with a plurality of screws.

7. A magnetic disk assembly as recited in claim 4 wherein said outer diameter of said cap corresponds to an outer diameter of said support hub.

8. A magnetic disk assembly made by a process comprising the steps of:
    providing a spindle hub having a lower support flange;
    alternately stacking a plurality of magnetic disks and annular spacer rings on said support flange of said spindle hub to form a magnetic disk stack;
    removably fastening a cap to a first end of said spindle hub;
    heating a clamp ring;
    placing said clamp ring around said cap on said first end of said spindle hub; and
    cooling said clamp ring to shrink said clamp ring about said cap to secure said magnetic disk stack to said spindle hub.

9. A magnetic disk assembly made by the process as recited in claim 8 wherein said step of removably fastening said cap to said first end of said spindle hub comprises turning screws through said cap and into said spindle hub.

10. A magnetic disk assembly made by the process as recited in claim 9 further comprising the step of counter sinking said screws into said cap.

11. A magnetic disk assembly made by the process as recited claim 8 wherein said step of removably fastening a cap to a first end of said spindle hub is performed before said step of heating said clamp ring and said step of placing said clamp ring around said cap on said first end of said spindle hub.

12. A magnetic disk assembly made by the process as recited claim 8 further comprising the step of sizing said cap to have a same outer diameter as an outer diameter of said spindle hub.

13. A magnetic disk assembly made by the process as recited claim 8 wherein said clamp ring puts a downward pressure on said magnetic disk stack.

* * * * *